INVENTORS.
PHILLIP H. ROBERTS
WILLIAM R. SNOOK, JR.
BY
ATTORNEY

United States Patent Office 3,263,946
Patented August 2, 1966

1

3,263,946
DRIVE MECHANISM
Phillip H. Roberts, New Orleans, La., and William R. Snook, Jr., Wichita, Kans., assignors to The Boeing Company, Seattle, Wash., a corporation of Delaware
Filed Aug. 19, 1964, Ser. No. 390,627
12 Claims. (Cl. 244—75)

This invention relates to a drive mechanism. More particularly this invention relates to an aircraft flap drive system and control means therefor.

One of the objects of this invention is the provision of a new and improved drive mechanism and control means therefor.

Another object of this invention is the provision of a novel drive mechanism having two power paths for driving at one speed up to a predetermined point and then driving at another speed.

A still further object of this invention is the provision for a new and improved flap drive mechanism having two power packages for driving the flaps independently of each other and coupled together in such a manner that operation of the drive by one power package alone increases the actuation time, but the operation of both power packages together reduces the operation time, each power package having a two-speed, reversible drive.

Another object of this invention is the provision of an electrical control means for controlling each power package, referred to in the preceding object, in such a manner as to sequentially start and stop each power package, reverse the direction of drive of each power package, and/or increase the drive speed of each power package.

Another object of this invention is the provision of a flap drive mechanism comprising two power packages in which the flaps are driven at a predetermined speed on the actuation of both power packages, at a reduced speed on the activation of only one power package, or at an increased speed when a brake is released and a clutch is engaged in each power package with one or both power packages in operation.

The invention further resides in certain novel features of construction, combinations, and arrangements of parts and further objects and advantages of the invention will be apparent to those skilled in the art to which it pertains from the following description of the present preferred embodiment thereof described with reference to the accompanying drawings, which form a part of this specification, wherein the same reference numerals indicate corresponding parts throughout the several views, and in which.

Figure 1:
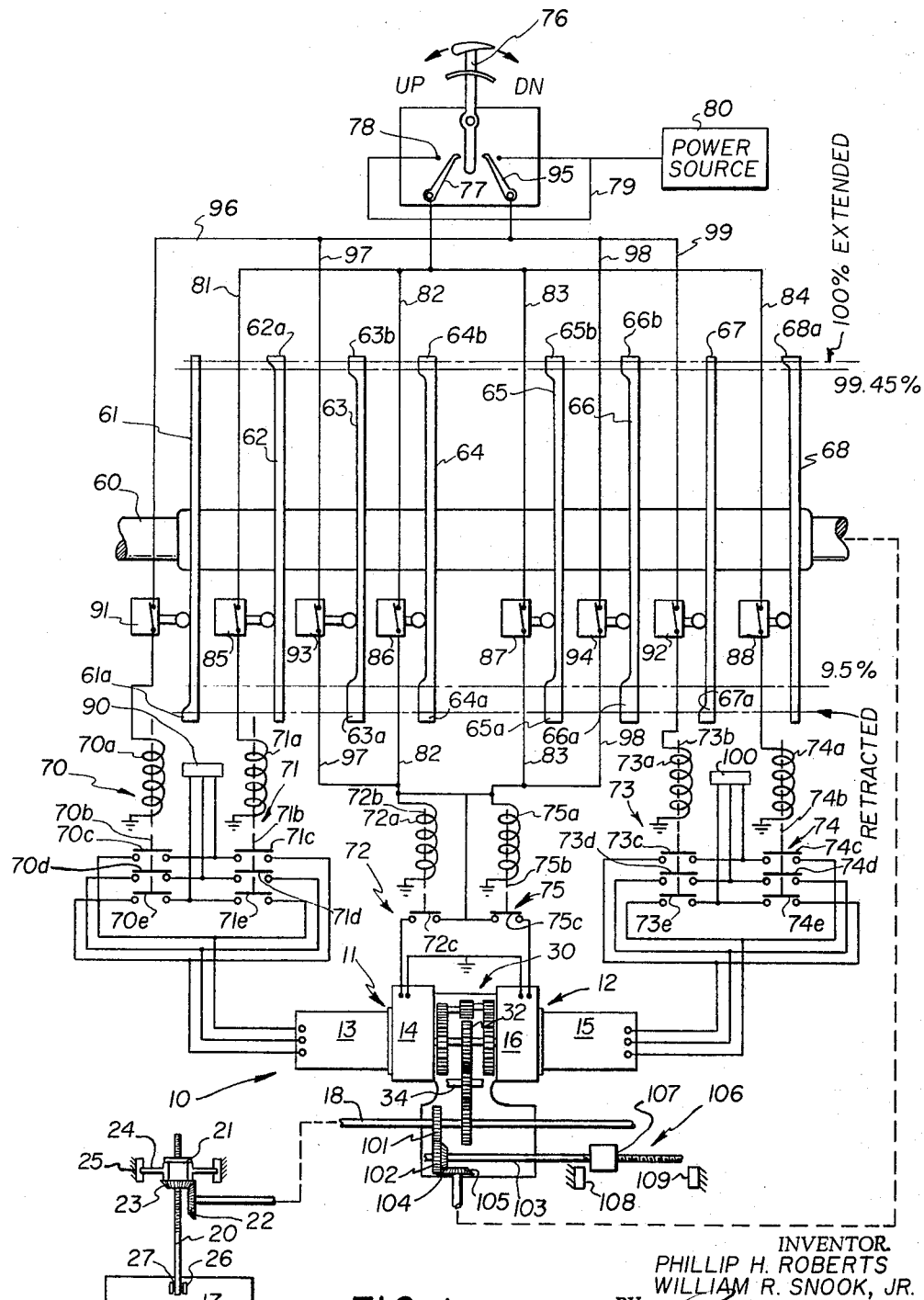
FIG. 1 is a schematic electromechanical diagram of a drive mechanism embodying the invention.

It is to be understood that the invention is not limited to the details of construction and the arrangements of parts shown in the drawings and hereafter described in detail, but is capable of being otherwise embodied and of being practiced and carried out in various ways. It is to be further understood that the terminology employed herein is for the purpose of description and there is no intention to herein limit the invention beyond the requirements of the prior art.

Referring to FIG. 1, reference numeral 10 indicates generally a flap drive mechanism comprising two power packages, indicated generally by reference numerals 11 and

2

Figure 3:
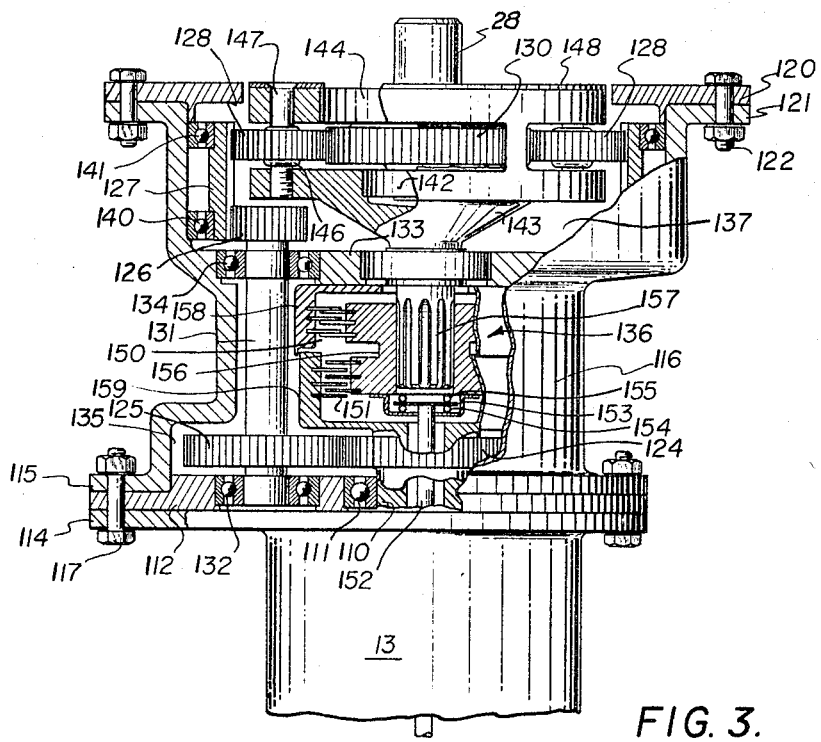
FIG. 3 is an elevational view of a transmission embodying the invention with certain parts shown broken away and in section to show certain internal details thereof.
Figure 4:
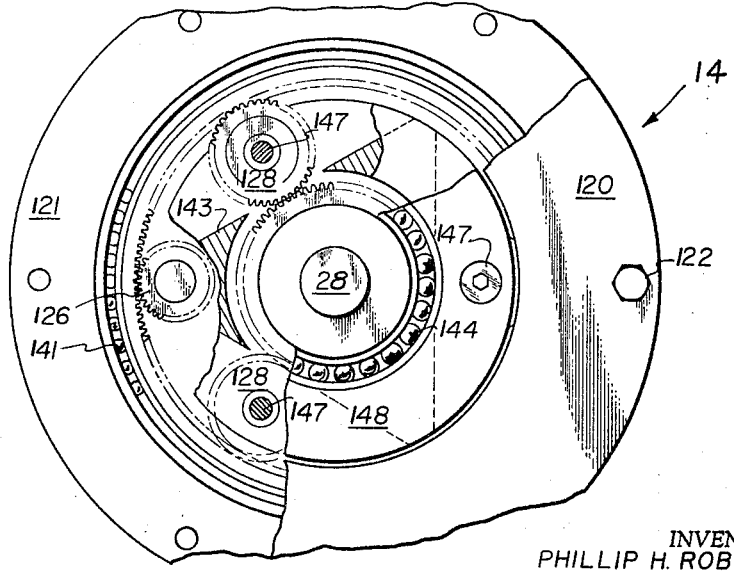
FIG. 4 is a top plan view of FIG. 3 with parts broken away and in section to further show certain internal details thereof.

12. Both power packages 11 and 12 are identical and the control means therefor are also identical. The power package 11 comprises a constant speed three phase, four hundred cycle, reversible electrical motor 13 and a two-speed reversible two power path transmission 14. The power package 12 comprises a similar motor 15 and a similar transmission 16. The two motors 13 and 15 are preferably of conventional construction and are adapted to have their drive shafts automatically braked when de-energized. The details of the transmissions 14 and 16 are shown in the inventors' co-pending patent application Serial Number 365,285, filed May 6, 1964 entitled "Transmission." The details of the transmission shown in FIGS. 3 and 4 are described hereinafter following the description of the overall drive mechanism of FIGS. 1 and 2. However, it is to be understood that other two-speed reverse drive transmissions can be used in lieu of the inventors' transmission disclosed in the co-pending application.

A driven element, such as an aircraft port wing flap 17, is shown driven by motion transmitted by way of a laterally extending torque tube or shaft 18, a differential screw 20, and a traveler nut 21. The traveler nut 21 travels along the screw 20 by being rotated. The nut 21, though it is permitted to be rotated, does not actually move longitudinally or laterally. A bevel gear 22 fixed to the tube 18 meshes with and drives a bevel gear 23 that is fixed to and turns with the traveler nut 21. The traveler nut 21 is retained and journaled in a bearing 24 fixed to a wing frame element 25. The differential screw 20, which does not turn, has its outer end pivotally connected between a pair of actuating crank elements 26 fixed to the flap 17 by means of a pivot pin 27. Another flap attached to a starboard wing, not shown, is adapted to be driven by the starboard end of the torque tube 18 in the same manner as flap 17 is driven.

Figure 2:
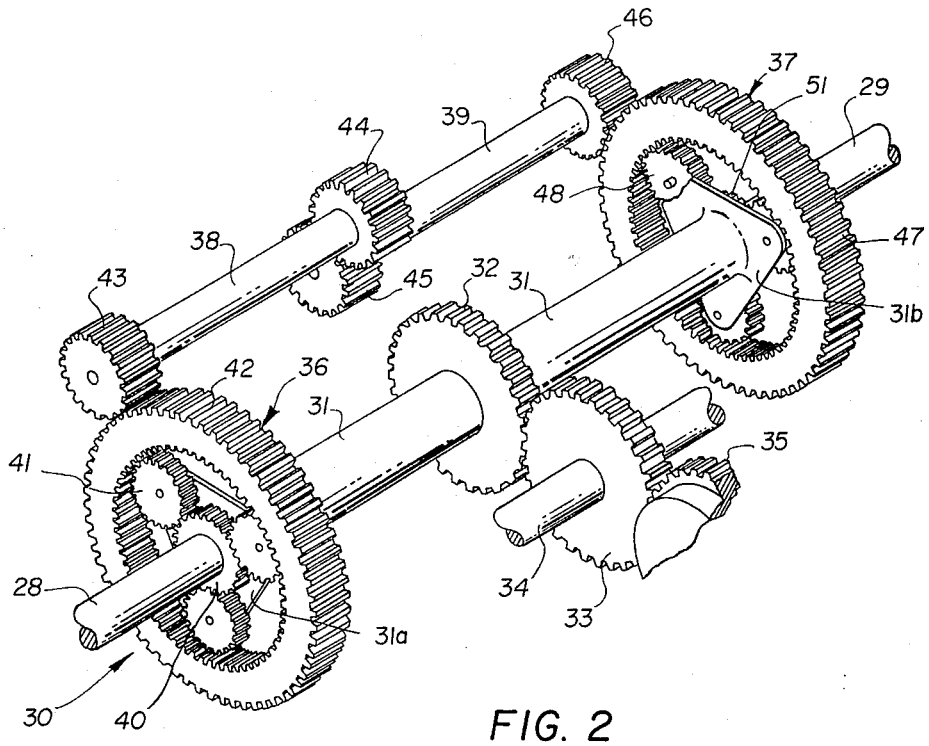
FIG. 2 is a pictorial view of a differential drive mechanism for providing a fail-safe coupling together of two power packages of the drive mechanism.

As seen in FIGS. 1 and 2, the torque tube 18 is driven via output shafts 28 and 29 of the transmissions 14 and 16. The transmissions 14 and 16 are respectively driven in what is ordinarily called opposite directions to each other by the motors 13 and 15 so that in essence the shafts 28 and 29 are driven in the same direction. The shafts 28 and 29 both transmit power to a differential mechanism indicated generally by reference numeral 30, a driven shaft 31 carrying a spur gear 32, a gear 33 mounted on a countershaft 34 and a gear 35 fixed to the torque tube 18.

The differential mechanism 30, FIG. 2, comprises two planetary gear trains indicated generally by reference numerals 36 and 37, geared together via synchronizing countershafts 38 and 39. The countershafts 38 and 39 provide an emergency drive or power path. More particularly, the planetary gear train 36 comprises a sun gear 40 driven by the output shaft 28 of the power package 11, three planet gears 41, and a ring gear 42. The three planet gears 41 are carried by and drive a spider 31a that is fixed to one end of the common drive shaft 31. The ring gear 42 has both internal and external teeth. A pinion 43, fixed to one end of the countershaft 38, is engaged with the external teeth of the ring gear 42. A gear 44 fixed to the opposite end of the countershaft 38 meshes with a gear 45 fixed to one end of the countershaft 39. A gear 46 is fixed to an opposite end of the countershaft 39 and meshes with external teeth of a ring gear 47 of the planetary gear train 37.

The gear train 37 further comprises three planet gears 48 carried by a spider 31b and meshes with a sun gear 51 and internal teeth of the ring gear 47. The sun gear 51 is fixed to and driven by the power output shaft 29 of the power package 12. The spider 31b is fixed to the other end of the common drive shaft 31.

Ordinarily when both power packages 11 and 12 are being operated, the output shafts 28 and 29 drive the common shaft 31 in one of two selectable directions, depending upon whether the flaps are being extended or retracted. In this case, the ring gears 42 and 47 are held stationary by the geared together countershafts 38 and 39. If, however, one power package, such as package 12, is de-energized and braked, the output shaft 29 thereof is braked. Accordingly, the sun gear 51 of the train 37 remains stationary with the planet gears 48 continuing to be driven, but at a reduced speed, by the shaft 31 and the spider 31b from the shaft 28 of the power package 13. The reason for the speed reduction is because the planet gears 48 are now free to turn the ring gear 47 and also turn the ring gear 42 at the same speed via the gear 46, the countershaft 39, the gears 45 and 44, the countershaft 38, and the gear 43. This turning of the ring gear 42 causes the planet gears 41 to be driven in such a direction as to reduce the turning speed of the spider 31a by half. This is desired because of the double load now borne by the lone power package 11 in operation.

As proof of this operation, assume the shaft 28 to be driven in a clockwise direction as viewed from the left in FIGS. 1 and 2. This means that the sun gear 40 is driving the spiders 31a and 31b and the common shaft 31 in a clockwise direction, the planet gears 41 and 48 being driven in a counterclockwise direction. The ring gear 47 is driven in a clockwise direction. The countershaft 39 and the gears 46 and 45 are driven in a counterclockwise direction while the countershaft 38 and the gears 44 and 43 are driven in a clockwise direction. The ring gear 42 is driven in a counterclockwise direction and thus slows the turning speed of the planet gears 41 and the spider 31a to half speed for example, depending upon the gear ratios selected.

The motors 13 and 15 and the transmissions 14 and 16 are each controlled by a novel control mechanism comprising a cam shaft 60 having disc cams 61, 62, 63, 64, 65, 66, 67 and 68 fixed thereto and spaced apart in parallel relationship. The energization and the polarity of such energization of the motor 13 is controlled by a pair of solenoid operated switches indicated generally by reference numerals 70 and 71. The control of the high speed operation of the transmission 14 is accomplished by means of a solenoid operated switch indicated generally by reference numeral 72. The energization and the polarity of such energization of the motor 15 is controlled by two solenoid operated switches indicated generally by reference numerals 73 and 74. The control of the high speed operation of the transmission 16 is accomplished by means of a solenoid operated switch indicated generally by reference numeral 75.

Assuming that it is desired to let the flaps 17 down, a pilot operated lever 76, preferably located on a control pedestal not shown, is moved rearwardly until a switch 77 is caused to be closed with a contact 78. The contact 78 is connected by a line 79 with a power source 80. The power source 80 is preferably 28 v. D.C., such as is provided in most aircraft.

The solenoid operated switch 70 comprises a grounded solenoid winding 70a having an armature 70b carrying three contacts 70c, 70d and 70e. The solenoid operated switch 71 comprises a grounded solenoid winding 71a having an armature 71b carrying three contacts 71c, 71d and 71e. The solenoid operated switch 72 comprises a grounded solenoid winding 72a having an armature 72b carrying a contact 72c. The solenoid operated switch 73 comprises a grounded solenoid winding 73a having an armature 73b carrying three contacts 73c, 73d and 73e. The solenoid operated switch 74 comprises a grounded solenoid winding 74a having an armature 74b carrying three contacts 74c, 74d and 74e. The solenoid operated switch 75 comprises a grounded solenoid winding 75a having an armature 75b carrying a contact 75c. The switches 70 and 71 control the connection of the three phase windings of the motor 13 to a power source 90. The power source 90 is preferably of a four hundred cycle, 110 v. A.C. usually available in an aircraft in addition to the 28 v. D.C. power source. It is noteworthy that when the switch 70 is energized, the polarity of the energizing voltage is such as to drive the motor 13 in one direction while closing of the switch 71 and opening of the switch 70 reverses the polarity and drives the motor 13 in an opposite direction.

Since the motors 13 and 15 are operated together and are driven in opposite directions, the switches 70 and 73 are closed and opened together, while the switches 71 and 74 are closed and opened together.

The switches 73 and 74 control the energization of the motor 15. The opening of the switch 73 and the closing of the switch 74 causes the motor 15 to be driven in one direction. But the opening of the switch 74 and closing of the switch 73 reverses the polarity of the energizing voltage and causes the motor 15 to be driven in a reverse direction. Both of the switches 73 and 74 control the flow of current from a four hundred cycle, 110 v. A.C. power source 100.

The switches 72 and 75 respectively control the high speed drive of the transmissions 14 and 16 of the power packages 10 and 11. The switches 72 and 75 are operated together so as to simultaneously close the contacts 72c and 75c by energizing the windings 72a and 75a. When the contacts 72c and 75c are closed, a brake is released and a clutch is engaged in each of the power package transmissions 14 and 16, respectively, for putting a second power path in operation. When the motors 13 and 15 are running, a first power path is in continuous operation.

When the flaps have been completely retracted and the lever 76 has been moved to the flap down position, the limit switches 85 and 88 are closed, but the limit switches 86 and 87 are open. The reason for this is that the only time the switches 85 and 88 are open is when they ride up on an arcuate cam lobe or track 62a and 68a of the disks 62 and 68. This occurs when the flaps 17 are, for example, down and stops the motors 13 and 15. This allows a very small percentage of the flap drive distance for stopping and overtravel of the motors 13 and 15. In other words, the lobes 62a and 68a serve as stops for the flap drive in the flap down direction. The drive 101, 102, 104, 105 for the cam shaft 60 is geared to turn the cam shaft 60 through 180 degrees between the flap up and flap down positions. A complete revolution of the cam shaft 60 will cause the flaps to be extended and retracted in a complete cycle before the next cycle can be begun.

Lobes 61a and 67a of the disks 61 and 67 serve to open limit switches 91 and 92 when the flaps 17 have traveled the distance in a flap retracting direction. The opening of the limit switches 91 and 92 de-energizes the solenoid operated switches 70 and 73 and stops the drive of the motors 13 and 15 in the flap retracting direction.

Limit switches 93 and 94 control the energization of the solenoid operated switches 72 and 75 when the lever 76 has been moved to the up-flap position and closes a switch 95 with the 28 v. D.C. power source 80. The closure of the switch 95 causes power to flow to the windings 70a, 72a, 75a, and 73a of the switches 70, 72, 75 and 73 by way of lines 96, 97, 98 and 99 respectively. The energization of the windings 70a, 72a, 75a and 73a are respectively controlled by the limit switches 91, 93, 94 and 92.

The limit switches 93 and 94 respectively permit the energization of the coils 72a and 75a of the switches 72 and 75 when the switches 93 and 94 ride down off of the lobes 63a and 66a of the cams 63 and 66 on the closing of the switch 95 by the lever 76 to the up-flap position. The limit switches 86 and 87 respectively permit the energization of the coils 72a and 75a of the switches 72 and 75 when the switches 86 and 87 ride down off of the lobes 64a and 65a of the cams 64 and 65 on the closing of the switch 77 by the lever 76 to the down-flap position. When the flaps reach 99.45 percent of their travel to their full extended position, the limit switches 93, 86, 87 and 94 ride up on lobes 63b, 64b, 65b and 66b for disconnecting the high speed drive path of the transmission 14 and 16 by de-energizing the coils 72a and 75a of the solenoid switches 72 and 75. This feature is to prevent overtravel of the flap drive in the down-flap direction.

The lobes 63a 64a, 65a, 66a are each formed and positioned in such a manner that the switches 72 and 75 will be energized for fast travel of the flaps when the flaps are extended 9.5 percent of the travel from a full retracted position. Many times it may be desirable to have the flaps travel at the faster pace at another point in the path of flap travel. This point could be less than or more than 9.5 percent of travel from a fully retracted position, if desired.

It is to be understood that by rearranging the placement of or changing the length of the lobes 63a, 64a, 65a, and 66a on the disks 63, 64, 65 and 66, either separately or in combination, the high speed drives of the transmissions 14 and 16 can be made to be brought into operation as desired either in the down-flap or up-flap direction or both.

The drive for the cam shaft 60 is preferably taken from the torque tube 18 via a drive gear 101 fixed to the torque tube 18, a gear 102 carried by a countershaft 103, a beveled driving gear 104 fixed to the shaft 103, and a driven gear 105 fixed to one end of the cam shaft 60.

Preferably the countershaft 103 is provided with a safety device indicated generally by the reference numeral 106. This safety device 106 is to prevent the overtravel of the flap drive in either direction. Preferably the device 106 comprises a traveling nut 107 threaded onto an end of the countershaft 103 and operates between two mechanical limit stops 108 and 109, one at either end of the path of nut travel. The stop 108 is at the end of the up-flap drive path so as to prevent overdrive of the flaps in an up-flap direction. The stop 109 is at the end of the down-flap drive path so as to prevent overdrive of the flaps in a down-flap direction.

Preferably, a conventional automatically releasable mechanical clutch, not shown, but contained in the gear 35 disengages the gear 35 from the torque tube 18 when a torque limit has been exceeded. This means that the clutch in the gear 35 is continuously mechanically engaged except when a certain torque limit is exceeded by resistance of the torque tube 18 to the drive units 11 and 12.

Referring to FIGS. 3 and 4, the transmission 14, for example, has an input shaft 110. The input shaft 110 is journaled by an antifriction bearing assembly 111 in a journal plate 112. The input shaft 110 is preferably driven by a reversible, constant speed electrical drive motor 13. The drive motor 13 has a housing with an end face plate 114 for supporting the bearing plate 112 and an end flange 115 of a transmission housing 116. The bearing plate 112 is sandwiched between the flanges 114 and 115 and secured in place by a plurality of nuts and bolts 117, FIG. 3. An end plate 120 is bolted to an end flange 121 of the housing 116 by a plurality of nuts and bolts 122, FIG. 3.

The motor 13, when energized, drives the input shaft 110 and an output shaft 28. The drive to the output shaft 28 is transmitted via a drive gear 124, a larger driven gear 125, a smaller gear 126, a ring gear 127, three planet gears 128 and a sun gear 130 fixed to the output shaft 28.

The input shaft 110 and the output shaft 28 are coaxial. The driving gear 124 is fixed to the input shaft 110. The gears 125 and 126 are mounted at opposite ends of a countershaft 131 that is driven in a direction counter to the input shaft 110. Accordingly, the shaft 131 is termed a countershaft. The shaft 131 is parallel to the input shaft 110 and the output shaft 28. The shaft 131 is journaled at its input end in the bearing plate 112 by means of a bearing assembly 132. The output end of the countershaft 131 is journaled in a partition 133 by a bearing assembly 134, FIG. 3. The output end of the countershaft 131 extends through the partition 133.

The partition 133 divides the housing 116 into two compartments. One of the two compartments within the housing 116, as defined by the partition 133, is identified as a clutch and brake compartment 135. This compartment 135 houses the gears 124, 125 and a clutch and brake assembly, indicated generally by the reference numeral 136. The other compartment is a planetary gear compartment 137 that houses the gears 126, 127, 128 and 130. The ring gear 127 is journaled by a pair of coaxial antifriction bearing assemblies 140 and 141 mounted internally of the housing 116. The sun gear 130 is fixed to the output shaft 28. The shaft 28 is journaled at its inner end by a bearing assembly 142 mounted internally of a planet carrier or spider 143. The shaft 28 is journaled at a mid-portion thereof by an antifriction bearing assembly 144 in the planet carrier 143. The bearing assembly 144 is disposed about a cylindrical flange or shoulder forming a part of the output shaft 28.

Each of the planet gears 128 is carried by an antifriction bearing assembly 146 on a stub shaft 147 within a slot in the periphery of the planet carrier 143. Each slot is milled along a chord of the circle described by the arcuate periphery of the cylindrical planet carrier 143. There are three stub shafts 147 and each has its ends supported in the planet carrier 143 and each is equally spaced 120 degrees apart. Preferably the outer ends of the planet stub shafts 147 are headed and provided with Allen wrench slots or openings, FIG. 4. The bearing assembly 144 is retained in place in the planet carrier 143 by an annular bearing retainer plate 148. Preferably the inner ends of the stub shafts 147 are threaded into and suitably locked in place in openings in the planet carrier 143. This is to assure that the planets 128 will rotate on the bearings 146 and the stub shafts 147 will not rotate within the carrier 143. If turning of the stub shafts 147 was permitted, the wear of the stub shafts 128 on the carrier 143 would eventually result in loose tolerances, misalignment, noise, and a changing gear ratio due to the planets 128 moving radially in and out.

The high speed mode of the transmission is accomplished by providing a direct drive to the planet carrier 143 by the input shaft 110. When it is desired to engage the high speed drive of the transmission, a brake 150 is disengaged and a clutch 151 is engaged within the brake and clutch assembly 136. This is preferably accomplished by energizing a solenoid, not shown, within the housing of the motor 13. Motion of the solenoid is transmitted via an actuating rod 152, FIG. 3, to disengage the brake 150 and engage the clutch 151.

When the high speed drive is to be disengaged, the solenoid is deenergized and a spring means, not shown, will restore the rod 152 back to its normal position. This will cause the clutch 151 to be disengaged and the spider brake 150 to be again engaged.

More particularly, the actuating rod 152 operated by the solenoid armature has a pressure plate 153 fixed to one end thereof. This pressure plate is sandwiched between a pair of antifriction thrust bearing assemblies 154 and 155 carried on one end of an axially reciprocable, driven pressure plate member 156. The member 156 is splined to a shaft end 157 of the planet carrier 143.

The clutch and brake assembly 136 comprises two cup-shaped housing members 158 and 159. The member 158 is fixed to the partition 133 of the transmission housing 136. The driven member 156 is telescoped within the member 158. Annular brake disks are fixed into the peripheral surface of a first cylindrical portion of the driven member 156. The member 158 carries annular clutch disks fixed internally thereof that are operatively engaged by the complementary clutch disks carried by the driven member 156. The member 159 is fixed to one end of the input shaft 110 and is rotatably telescoped within the member 158. The member 159 carries annular clutch disks fixed internally thereof that are operatively engaged by complementary clutch disks fixed into the peripheral surface of a second cylindrical end portion of the driven member 156.

In the low speed drive mode, the planets 128 are driven in a counterclockwise direction as seen in FIG. 4. However, the planet carrier 143 is driven by the shaft 110 in a clockwise direction when in high speed mode and, accordingly, increases the speed of the planets with an accompanying increase in speed of the output shaft 28.

It will be understood that this invention can be modified to adapt it to various circumstances and conditions, and it is accordingly desired to comprehend within the purview of this invention such modifications as may be considered to fall within the scope of the appended claims.

What is claimed is:

1. In an aircraft, a wing, a flap operatively connected to a trailing portion of said wing, means for extending and retracting said flap comprising, reversible constant speed electrical drive motor means, two-speed reversible mechanical power transmission means having first and second drive transmission means respectively forming first and second power paths, said power transmission means being drivingly connected to said flap, clutch means and brake means in said second power path having an input directly connected to and driven by said drive motor means and an output directly connected to and driving said second drive transmission means when said clutch means is engaged, said first drive transmission means being continuously drivingly connected to and driven by said drive motor means and continuously connected to and driving said flap when said drive motor means is energized, said drive motor means driving both said first and second drive transmission means for driving said flap at an increased speed when said brake means is released and said clutch means is engaged, third drive transmission means and electrical control means having a manually operable flap control switch and means connected to and driven by said power transmission means for controlling the extension and retraction of said flap and for causing said drive motor means to turn in one direction when said flap control switch is closed in one direction so as to extend said flap and for causing said drive motor means to turn in another direction when said flap control switch is closed in another direction so as to retract said flap, said electrical control means including means for controlling the engagement of said clutch means and release of said brake means for causing said flap to be extended and retracted at the increased speed when said flap is extended beyond a predetermined point between the fully extended and fully retracted flap positions, and said electrical control means comprising a plurality of cams ganged on a drum mechanically driven by said third drive transmission means having first cam means operating a first limit switch for automatically stopping said drive motor means when said flap has been completely extended, second cam means operating a second limit switch for stopping said drive motor when said flap has been completely retracted, third cam means operating a third limit switch for disengaging said brake means and engaging said clutch means when said flap has reached said predetermined point on being extended, and fourth cam means operating a fourth limit switch for disengaging said clutch means and engaging said brake means when said flap has reached said predetermined point on being retracted.

2. In an aircraft as set forth in claim 1, wherein said predetermined point is at approximately 9.5 percent of flap extension.

3. In an aircraft, a wing, a flap operatively connected to the trailing portion of said wing, means for extending and retracting said flap comprising, reversible constant speed electrical drive motor means, two-speed reversible mechanical power transmission means drivingly connected to said flap and having first and second drive transmission means respectively forming first and second power paths, brake means and clutch means having an input directly connected to and driven by said drive motor means and an output directly connected to and driving said second drive transmission means when said clutch means is engaged, said first drive transmission means being continuously drivingly connected to and driven by said drive motor means and continuously connected to and driving said flap when said drive motor means is energized, said drive motor means driving said flap at an increased speed through said clutch means and said second drive transmission means when said brake means is released and said clutch means is engaged, and electrical control means driven by said power transmission means for causing said drive motor means to turn in one direction when a manually operable flap control switch is closed in one direction so as to extend said flap and for causing said drive motor means to turn in another direction when said flap control switch is closed in another direction so as to retract said flap, and said electrical control means including means for controlling said clutch means and said brake means for causing said flap to be extended and retracted at the increased speed when said flap is extended beyond a predetermined point.

4. In an aircraft, a wing, a flap operatively connected to the trailing portion of said wing, means for extending and retracting said flap comprising, reversible constant speed electrical drive motor means, two-speed reversible mechanical power transmission means drivingly connected to said flap, clutch means and brake means controlling the high speed drive of said power transmission means, said power transmission means being continuously drivingly connected to and driven by said drive motor means and continuously connected to and driving said flap when said drive motor means is energized, said drive motor means driving said flap at the high speed when said brake means is released and said clutch means is engaged in a direction, and electrical control means driven by said power transmission means for causing said drive motor means to turn in one direction when a manually operable flap control switch is closed in one direction so as to extend said flap and for causing said drive motor means to be turned in another direction when said flap control switch is closed in another direction so as to retract said flap, and said electrical control means including means for controlling said clutch means and brake means for causing said flap to be extended and retracted at the high speed when said flap is extended beyond a predetermined point.

5. In an aircraft, a wing, a flap operatively connected to the trailing portion of said wing, means for extending and retracting said flap comprising, drive means, power transmission means drivingly connected to said flap, clutch means controlling the high speed drive of said power transmission means, said power transmission means being continuously drivingly connected to and driven by said drive means and continuously connected to and driving said flap when said drive means is energized, said drive means driving said flap at the high speed when said clutch means is engaged, and control means driven by said power transmission means for causing said drive means to turn in one direction when a manually operable flap control is closed in one direction so as to extend said flap and for causing said drive means to turn in another direction when said flap control is closed in another direction so as to retract said flap, and said control means including means for controlling said clutch means for causing said flap to be extended and retracted at the high speed when said flap is extended beyond a predetermined point.

6. In an aircraft, a wing, a flap operatively connected to the trailing portion of said wing, means for extending and retracting said flap comprising, first means, second means drivingly connected to said flap, third means controlling the high speed drive of said second means, said second means being continuously drivingly connected to and driven by said first means and continuously connected to and driving said flap when said first means is energized, said first means driving said flap at the high speed when said third means is engaged, and fourth means driven by said second means for causing said first means to turn in one direction when fifth means is closed in one direction so as to extend said flap and for causing said flap to be retracted when said fifth means is closed in another direction.

7. In an aircraft as set forth in claim 6, wherein said fourth means includes sixth means for controlling said third means and causing said flap to be extended and retracted at the high speed when said flap is extended beyond a predetermined point.

8. A multispeed drive mechanism comprising, reversible constant speed electrical drive motor means, two-speed reversible mechanical power transmission means drivingly connected to an output shaft, clutch means and brake means having an input directly connected to and driven by said drive motor means and an output directly connected to and driving said power transmission means when said clutch means is engaged, said power transmission means being continuously drivingly connected to and driven by said drive motor means and continuously connected to and driving said output shaft when said drive motor means is energized, said drive motor means driving said output shaft at an increased speed when said brake means is released and said clutch means is engaged, and electrical control means driven by said power transmission means for causing said drive motor means to turn in one direction when a manually operable output shaft control switch is closed in one direction and for causing said drive motor means to turn in another direction when said output shaft control switch is closed in another direction, and said electrical control means including means for controlling said clutch means and said brake means for causing said output shaft to be driven at an increased speed when said output shaft has been turned a predetermined number of times.

9. A multispeed drive mechanism comprising, drive motor means, power transmission means drivingly connected to an output shaft, clutch means having an input directly connected to and driven by said drive motor means and an output directly connected to and driving said power transmission means when said clutch means is engaged, said power transmission means being continuously drivingly connected to and driven by said drive motor means and continuously connected to and driving said output shaft when said drive motor means is energized, said drive motor means driving said output shaft at an increased speed when said clutch means is engaged, and electrical control means driven by said power transmission means for causing said drive motor means to turn in one direction when a manually operable output shaft control switch is closed in one direction and for causing said drive motor means to turn in another direction when said output shaft control switch is closed in another direction.

10. A multispeed drive mechanism comprising, drive motor means, mechanical power transmission means drivingly connected to an output shaft, clutch means having an input directly connected to and driven by said drive motor means and an output directly connected to and driving said power transmission means when said clutch means is engaged, said power transmission means being continuously drivingly connected to and driven by said drive motor means and continuously connected to and driving said output shaft when said drive motor means is energized, said drive motor means driving said output shaft at a different speed when said clutch means is engaged, and electrical control means driven by said power transmission means for controlling said drive motor means, and said electrical control means including means for controlling said clutch means.

11. In an aircraft, a torque shaft, first and second reversible constant speed electrical drive motor means, first and second two-speed reversible mechanical power transmission means having first and second drive transmission means respectively forming first and second power paths, said first and second power transmission means being drivingly connected to said torque shaft, clutch means and brake means in said second power path having an input directly connected to and driven by said drive motor means and having an output directly connected to and driving said second drive transmission means when said clutch means is engaged, said first drive transmission means being continuously drivingly connected to and driven by said drive motor means and continuously connected to and driving said flap when said drive motor means is energized, said drive motor means driving both said first and second drive transmission means and said torque shaft at an increased speed when said brake means is released and said clutch means is engaged, third drive transmission means and electrical control means having a manually operable flap control switch and means connected to and driven by said first and second power transmission means for controlling the extension and retraction of said flap and for causing said first and second drive motor means to turn in one direction when said flap control switch is closed in one direction and for causing said first and second motor means to turn in another direction when said flap control switch is closed in another direction, said electrical control means including means for controlling the engagement of said clutch means and release of said brake means for causing said torque shaft to be driven at an increased speed when said torque shaft has been turned a predetermined number of times from a starting point, and said electrical control means comprising a plurality of cams ganged on a drum mechanically driven by said third drive transmission means having first cam means operating a first limit switch for automatically stopping said first and second drive motor means when said torque shaft has been turned a predetermined number of times, second cam means operating a second limit switch for stopping said first and second drive motor means when said torque shaft has been turned in a reverse direction a predetermined number of times, third cam means operating a third limit switch for disengaging said brake means and engaging said clutch means when said torque shaft has been turned a lesser number of times than said predetermined number of times in said one direction, and fourth cam means operating a fourth limit switch for disengaging said clutch means and engaging said brake means when said torque shaft has been turned in said reverse direction said lesser number of times.

12. In an aircraft, a wing, a flap operatively connected to said wing, means for extending and retracting said flap comprising, a common shaft, a first sun gear fixed to one end of said common shaft, a second sun gear fixed to another end of said common shaft, first planet gear means meshing with said first sun gear, a first planet gear carrier connected to said planet gears, second planet gear means meshing with said second sun gear, a second planet gear carrier connected to said second planet gear means, a first ring gear, meshing with said first planet gear means, a second ring gear meshing with said second planet gear means, first countershaft means having a gear on each end thereof with one gear meshing with said first ring gear, a second countershaft having a gear on each end thereof with one gear meshing with said second ring gear and another gear meshing with the one other gear of said first countershaft, first and second reversible constant speed electrical drive motor means, first and second two-speed reversible mechanical power transmission means respectively connected to said first and second drive motor means and each having first and second drive transmission means respectively forming first and second power paths, first and second clutch and brake means having an input respectively directly connected to and driven by said first and second drive motor means and having an output respectively directly connected to and driving said second drive transmission means, when said clutch means is engaged, said first drive transmission means being continuously drivingly connected to and driven by said first drive motor means and continuously connected to and driving said first planet gear carrier when said drive motor means is energized, said drive motor means driving said flap at an increased speed through said clutch means and said second drive transmission means when said brake means is released and said clutch means is engaged, and electrical control means driven by said power transmission means for causing said drive motor means to turn in one direction when a manually operable flap control switch is closed in one direction so as to extend said flap for causing said flap to be retracted when said flap control switch is closed in another direction, and said electrical control means including means for controlling said clutch means and said brake means for causing said flap to be extended and retracted at an increased speed when said flap is extended beyond a predetermined point.

References Cited by the Examiner

UNITED STATES PATENTS

| | | | |
|---|---|---|---|
| 2,578,015 | 12/1951 | Rienhard | 318—8 |
| 2,796,774 | 6/1957 | Peed | 244—83 |
| 2,809,736 | 10/1957 | Hoover | 192—143 |
| 3,016,778 | 1/1962 | Fitzner | 74—472 |
| 3,063,708 | 11/1962 | Wollenhaupt | 192—143 |

MILTON BUCHLER, *Primary Examiner.*

ANDREW H. FARRELL, *Examiner.*